July 10, 1945. G. E. DATH 2,380,028
FRICTION SHOCK ABSORBER
Filed Oct. 20, 1943
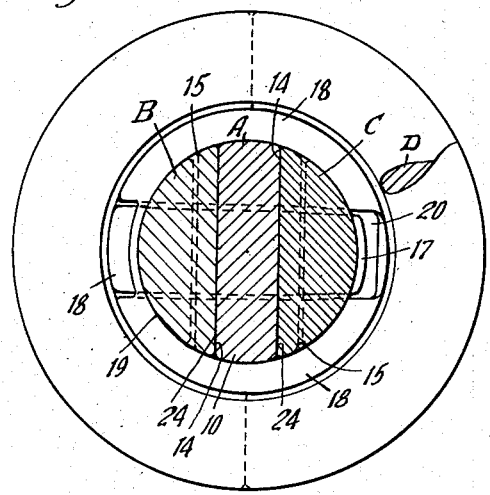
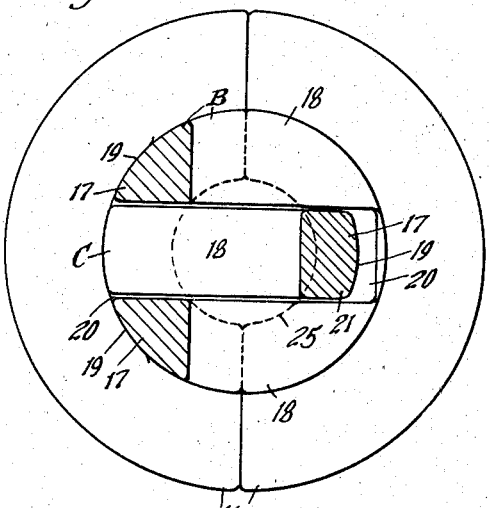
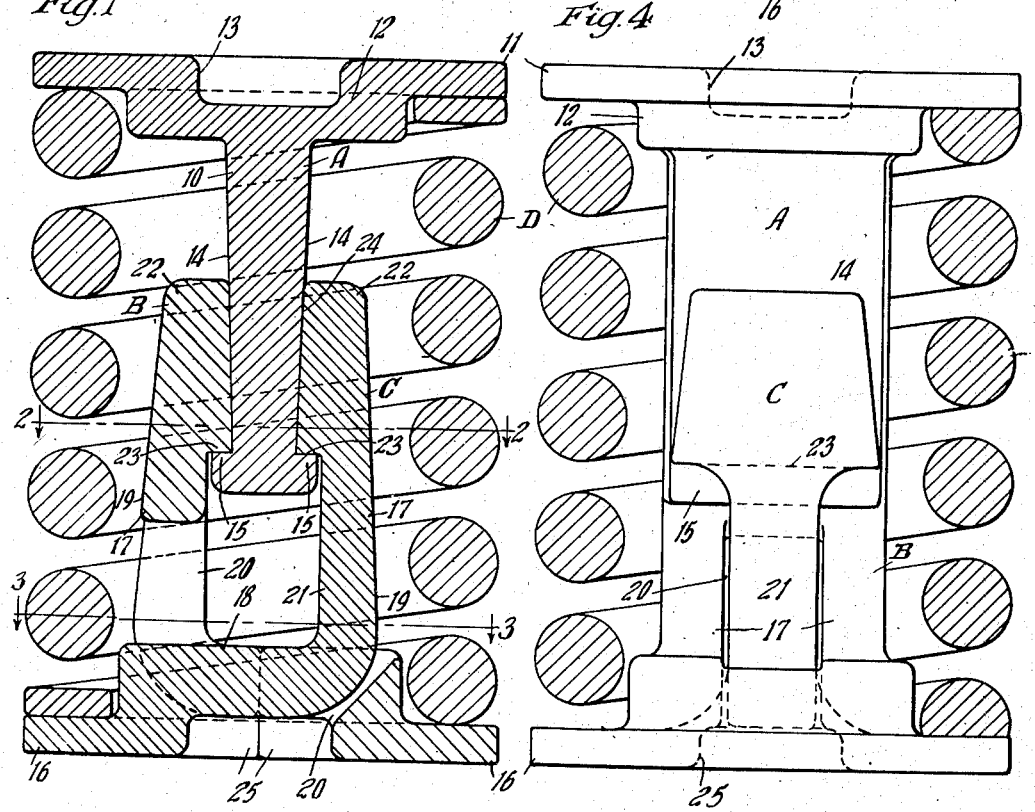
Inventor
George E. Dath
By Henry Fuchs.
Atty.

Patented July 10, 1945

2,380,028

UNITED STATES PATENT OFFICE 2,380,028

FRICTION SHOCK ABSORBER

George E. Dath, Chicago, Ill., assignor to W. H. Miner, Inc., Chicago, Ill., a corporation of Delaware Application October 20, 1943, Serial No. 506,944

6 Claims. (Cl. 267—9)

This invention relates to improvements in friction shock absorbers, especially adapted for use in connection with truck springs of railway cars for snubbing or dampening the action of the springs.

One object of the invention is to provide a friction shock absorber which is substituted for one or more of the spring units of a cluster of truck springs of a railway car to dampen the action of the truck springs.

A further object of the invention is to provide a friction shock absorber of the character indicated, of simple design, comprising a friction post and a pair of friction shoe members having sliding frictional engagement with the post, wherein the relative movement of the post and shoes is yieldingly resisted by spring means which also serves to press the shoes and post into tight frictional engagement with each other.

A more specific object of the invention is to provide a friction shock absorbing mechanism as set forth in the preceding paragraph, wherein the post is tapered and the shoes embrace the tapered post at opposite sides and are held in frictional contact with the post by a spring element surrounding the post and shoes and having its opposite ends bearing on an abutment flange on the post and base flanges on the shoes, which base flanges mount the shoes for slight rocking action against the resistance of the spring, whereby spreading of the shoes through the action of the tapered post is yieldingly resisted by the spring element.

Other objects of the invention will more clearly appear from the description and claims hereinafter following.

In the drawing forming a part of this specification, Figure 1 is a transverse vertical sectional view of my improved friction shock absorber. Figures 2 and 3 are horizontal sectional views, corresponding respectively to the lines 2—2 and 3—3 of Figure 1, the spring resistance being omitted in Figure 3. Figure 4 is an elevational view, looking from right to left in Figure 1, the spring resistance being shown in vertical section.

As shown in the drawing, my improved friction shock absorber comprises broadly a friction post A; two friction shoes B and C; and a spring resistance D.

The friction post A comprises a relatively wide platelike portion 10, which forms the post member proper, having a laterally projecting annular flange 11 at the upper end, which is in the form of a heavy disc, having a downwardly offset central portion 12, which is formed with a central depression or recess 13, adapted to accommodate the usual spring centering projection of the top spring plate for the truck spring cluster of the railway car. The post member proper, which depends from the disclike portion 11, is tapered downwardly, as clearly shown in Figure 1, thus presenting flat friction surfaces 14—14 on opposite sides thereof which converge toward each other in downward direction. At the bottom end, the post is provided with laterally, outwardly projecting, heavy flanges 15—15 at the friction surface sides thereof, forming, in effect, a head member presenting upwardly facing, horizontal stop shoulders.

The two friction shoes B and C are of similar design except as hereinafter pointed out. Each shoe comprises a base portion 16 and an arm 17 upstanding from said base portion. Each base portion comprises a half ring section, the two half ring sections being in abutment with each other and together defining a complete two piece ring. Each arm 17 is of substantially L-shaped form having a horizontally disposed bottom section 18 which is raised above the base portion and an upwardly extending, vertically disposed section 19 at the outer end of the section 18. The section 18 and the lower end of the section 19 of the arm 17 of the shoe B are slotted lengthwise, as indicated at 20 in Figures 1, 3, and 4, to accommodate the corresponding portions of the arm 17 of the shoe C which are reduced in width, as clearly shown in Figures 1, 2, and 3, the reduced portion being indicated by 21. As shown in the drawing, the horizontal bottom sections 18 of the arms 17 of the two shoes extend in opposite directions from their respective bases 16—16 so that the vertical section 19 of the L-shaped arm 17 of each shoe and its base 16 are located at opposite sides of the post A. The upper end portion of each arm 17 is provided with a lateral enlargement 22 on the inner side thereof, providing a downwardly facing, horizontal shoulder 23, overhanging the corresponding stop flange 15 of the post A. The enlargement 22 presents a longitudinally extending, flat friction surface 24 on the inner side of the shoe, which is engaged with the friction surface 14 at the corresponding side of the post. As shown most clearly in Figure 1, the base members 16—16 are provided with openings 25 adapted to receive the usual centering projection of the bottom spring plate of the truck spring cluster.

The spring resistance D is in the form of a single coil surrounding the post A and the upstanding portions 19 of the arms 17 of the shoes B and C, and has its upper and lower ends bearing respectively on the flange 11 of the post A and the base portions 16—16 of the shoes B and C.

The outer sides of the sections 19 of the arms 17 are preferably rounded off, as shown, and upwardly tapered to provide proper clearance to facilitate assembling of the parts within the spring coil.

In assembling the parts of my improved friction shock absorber, the shoes B and C are first connected to each other by engaging the arm 17 of the shoe C through the opening or slot 20 of the arm 17 of the shoe B, the shoe C being first turned to position to align the width of the upper end of the arm 17 of said shoe with the length of said slot so that said relatively wide upper end will readily pass through the slot. After the broad portion of the arm 17 has been passed through the slot, the shoe C is adjusted to the position shown in Figure 1. With the shoes B and C positioned, as shown in Figure 1, the arms 17—17 are spread apart at their upper ends by raising the base portions 16—16 at their outer ends. To hold the shoes in this tilted position, supports in the form of blocks are placed under the base portions 16—16 at diametrically opposite sides of the mechanism remote from the meeting edges of the base portions. The spring D is then placed around the shoes, resting on the base flanges 16—16. The post is then applied by inserting the same downwardly within the coil of the spring D and entering the same between the tilted shoes B and C. As the post is forced downwardly, the spring D is compressed against the base portions 16—16 of the shoes. The post is forced downwardly until the stop flanges 15—15 thereof are at a level below the shoulders 23—23 of the shoes. The supports for the base portions are then removed, permitting the shoes B and C to swing into engagement with the post A under the pressure of the spring D, thereby bringing the parts to the assembled position shown in Figure 1 with the shoulders 23—23 in overhanging engagement with the stop flanges 15—15 of the post.

The operation of the improved shock absorbing mechanism is as follows: Upon the cluster of springs of the railway car truck being compressed between the spring follower plates of the truck springs, the friction post A and the friction shoes B and C are moved toward each other in lengthwise direction against the resistance of the spring D. Due to the taper of the post, the cooperating ends of the shoes are spread apart and the shoes titlted on the inner ends of their base members against the resistance of the spring D which bears on said base members 16—16 of the shoes. High frictional resistance is thus produced between the friction surfaces of the post and shoes, thereby snubbing the action of the truck springs. Upon the spring follower plates being moved apart during recoil of the truck springs, the expansive action of the spring D restores all of the parts to the normal release position shown in Figure 1, separation of the post and shoes in lengthwise direction being limited by engagement of the stop flanges 15—15 of the post with the shoulders 23—23 of the shoes.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a tapered friction post; of tiltable friction shoes embracing said post at opposite sides, each shoe having a base portion extending laterally therefrom, said base portion being fulcrumed at its inner end, said shoes and post being slidable lengthwise with respect to each other; and a spring opposing relative movement of the shoes and post toward each other, said spring bearing on said base portions of the shoes to resist tilting movement of the same.

2. In a friction shock absorber, the combination with a tapered friction post; of tiltable friction shoes embracing said post at opposite sides, each shoe having a base portion projecting laterally therefrom and beyond the side of the post opposite to the side engaged by said shoe, said base portion being fulcrumed at its inner end, said shoes and post being slidable lengthwise with respect to each other; and a spring opposing relative movement of the shoes and post in lengthwise direction toward each other, said spring bearing on the base portions of said shoes to resist tilting movement of the same.

3. In a friction shock absorber, the combination with a tapered friction post having a laterally projecting flange at the upper end thereof; of a pair of friction shoes embracing said post at opposite sides, each shoe having an upstanding section and a base portion projecting laterally from said base portion, the base portion of each shoe extending toward the other shoe and outwardly beyond the same, each shoe being tiltable about the inner end of its base portion toward and away from said post, said shoes and post being slidable with respect to each other in lengthwise direction; and spring means surrounding said shoes and post and bearing at its opposite ends on the flange of the post and base portions of said shoes, said spring means opposing relative longitudinal movement of said post and shoes toward each other and tilting movement of the shoes away from said post.

4. In a friction shock absorber, the combination with a top follower plate; of a friction post depending centrally from said plate, said post being tapered toward its lower end; a pair of friction shoes at opposite sides of the post, each shoe having a laterally extending base flange projecting toward and beyond the other shoe, the base portion of one of said shoes having an opening therethrough, through which the base portion of the other shoe extends, each shoe being tiltable about the inner end of its base portion toward and away from said post, said shoes and post being slidable with respect to each other in lengthwise direction; and spring means surrounding said post and shoes and bearing at its opposite ends on the follower plate and the base portions of the shoes to oppose relative longitudinal movement of said post and shoes toward each other and tilting movement of said shoes away from the post.

5. In a friction shock absorber, the combination with a top follower plate; of a friction post depending centrally from said plate, said post having friction surfaces on opposite sides thereof, said friction surfaces converging toward the lower end of said post; friction shoes at opposite sides of the post having lengthwise sliding engagement with the respective friction surfaces of the post, each shoe having a laterally extending base portion at the lower end, the base portion of each shoe extending toward and beyond the other shoe, one of said shoes having an opening therethrough, through which the base portion of the other shoe extends, each shoe being tiltable on the inner end of its base portion toward and away from said post; and spring means surrounding said post and shoes and bearing at opposite ends on the follower plate and base portions of the shoes to oppose relative longitudinal movement of said post and shoes toward each other and tilting movement of said shoes away from the post.

6. In a friction shock absorber, the combination with a tapered friction post having laterally projecting stop flanges at the lower end thereof; of tiltable friction shoes embracing said post at opposite sides, each shoe having a shoulder overhanging the stop flange at the corresponding side of the post to limit relative separation of the shoes and post in lengthwise direction, each shoe having a base portion projecting laterally therefrom and beyond the side of the post opposite to the side engaged by said shoe, said base portion being fulcrumed at its inner end, said shoes and post being slidable lengthwise with respect to each other; and a spring opposing relative movement of the shoes and post in lengthwise direction toward each other, said spring bearing on the base portions of said shoes to resist tilting movement of the same.

GEORGE E. DATH.